(12) United States Patent
Aksuyek

(10) Patent No.: US 9,389,021 B2
(45) Date of Patent: Jul. 12, 2016

(54) COOLING SYSTEM AND METHOD FOR AIR COOLED CHILLERS

(76) Inventor: Cuneyt Aksuyek, Izmir (TR)

( * ) Notice: Subject to any disclaimer, the term of this patent is extended or adjusted under 35 U.S.C. 154(b) by 302 days.

(21) Appl. No.: 13/818,896

(22) PCT Filed: Aug. 19, 2011

(86) PCT No.: PCT/TR2011/000195
§ 371 (c)(1),
(2), (4) Date: Apr. 4, 2013

(87) PCT Pub. No.: WO2012/026905
PCT Pub. Date: Mar. 1, 2012

(65) Prior Publication Data
US 2013/0205816 A1 Aug. 15, 2013

(30) Foreign Application Priority Data
Aug. 23, 2010 (TR) .................................. 2010/07003

(51) Int. Cl.
*F28C 1/00* (2006.01)
*F28C 3/08* (2006.01)
*F24F 5/00* (2006.01)
*F24F 1/00* (2011.01)
*F24F 13/22* (2006.01)

(52) U.S. Cl.
CPC ................ *F28C 3/08* (2013.01); *F24F 5/0035* (2013.01); *F24F 2001/0092* (2013.01); *F24F 2013/225* (2013.01); *Y02B 10/40* (2013.01); *Y02B 30/545* (2013.01)

(58) Field of Classification Search
CPC .......................... F25B 2339/041; F24F 5/0035
See application file for complete search history.

(56) References Cited

U.S. PATENT DOCUMENTS

| | | | | |
|---|---|---|---|---|
| 3,645,071 | A * | 2/1972 | Gray | ................................. 96/364 |
| 4,028,906 | A | 6/1977 | Gingold et al. | |
| 5,497,633 | A * | 3/1996 | Jones et al. | ...................... 62/314 |
| 5,966,953 | A * | 10/1999 | Murr | .................... A01K 1/0082 261/27 |
| 6,575,436 | B2 * | 6/2003 | Litz | ................................. 261/27 |
| 6,761,039 | B1 | 7/2004 | Gray | |
| 7,131,639 | B2 * | 11/2006 | Kammerzell | ......... F24F 5/0035 261/106 |
| 2003/0150226 | A1 | 8/2003 | Jensen | |
| 2003/0221440 | A1 | 12/2003 | Limehouse | |
| 2004/0129014 | A1 | 7/2004 | Richman | |
| 2006/0243730 | A1 * | 11/2006 | Oubichon | ..................... 220/315 |

FOREIGN PATENT DOCUMENTS

EP 0268776 A2 6/1988

OTHER PUBLICATIONS

International Search Report for corresponding International Application No. PCT/TR2011/000195.

* cited by examiner

*Primary Examiner* — Allen Flanigan
*Assistant Examiner* — Filip Zec
(74) *Attorney, Agent, or Firm* — Egbert Law Offices, PLLC

(57) ABSTRACT

A cooling system connected to the air inlet of an air cooled chiller, having at least one frame, at least one net through which the air absorbed by the chiller is passed, at least one liquid spraying component performing spraying on the front part of said net's outer surface not facing the chiller, contrariwise to the chiller and to the incoming direction of air, at least one liquid supply kit sending liquid to said liquid spraying component and at least one liquid transmission instrument carrying the liquid from the liquid supply kit to the spraying component. A cooling method wherein this system is used is also provided.

9 Claims, 3 Drawing Sheets

COOLING SYSTEM AND METHOD FOR AIR COOLED CHILLERS

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The invention relates to cooling system used directly or indirectly (in air cooled cooling systems) and method of this.

The invention relates particularly to cooling system and method providing economical cooling of air in the inlet (suction) of air cooled condensers used in said cooling systems, increasing the capacity of mechanical unit cooler as a result of cooling of the air in front of the condenser, decreasing operational cost.

2. Description of Related Art Including Information Disclosed Under 37 CFR 1.97 and 37 CFR 1.98.

The cooling systems used in industrial cooling systems and in air conditioning have a highly wide range of application field. In addition to process systems, agriculture, livestock farming, textile, priming, wood working, etc. and geothermal or natural gas-cycle power plants, cogeneration and trigeneration systems and petro-chemical plants can be shown as examples of this.

Of the cooling systems, temperature of the air procured, from outer environment poses a significantly high importance in air cooled systems. That is because there is an inverse proportion between the amount of cooling wanted to be obtained, by means of cooling of inner location and the air temperature of the outer environment. As the temperature of outer environment temperature increases, the amount of cooling becomes decreased. Therefore, time lapsing for cooling of inner location and the energy consumed for this will be much more. That is, the less the temperature of outer location is, the more the efficiency yielded and the energy spent is decreased in considerable amount.

Therefore, works were carried out for dropping the air temperature in the inlet of the condenser. The first method obtained as the result of these works and used at present evaporative cooling pads. The pads located in front of the condenser intake air are continuously kept wet by means of a water circulation pump. Air passing through with the help of direct or indirect fans causes the water in pads evaporate and is cooled of when going over said wet pads. Thus, air temperature is reduced to a value which is approximately close to wet bulb temperature. As a result, the work needed to be carried out by the unit cooler becomes less and its performances is increased.

As an example to this method, files with publication U.S. Pat. No. 7,014,174B2, US2005046050 A1 and CN201218576Y can be shown as examples. All the three files mention pads that are wetted and increase the cooling performance and their usage.

However, said cooling pads lead to pressure losses during transition of the air. Therefore, the amount of air passing over the condenser becomes less. Decreased amount of air passing over the condenser leads to a significant portion of the advantage provided by means of chilling effect. In addition, the amount of water used is quite a lot. The most important reasons of this is that they usually not comprise a system which will determine the amount of water and have a continuous water flow. Re-usage of water on the other hand can lead to different problems. Besides, assembly and maintenance costs of said systems are quite high. Additionally, dust particles in the air can form a layer of dust on the coil by intermingling with water. Such negativism also increases the costs.

A further method employed on the other hand involves spraying water over coolants such as air-cooled operated condenser and wetting the components such as plate, pipe, wall, etc. whose heat transfers are complete. Thus, water sprayed is evaporated, difference of temperature required for heat transfer becomes increased and support for cooling is provided. Thus, performance of the condenser or the unit cooler is increased.

As examples to said systems, files with the publication number WO2007025465 A1, CN101650135 A and JP2007024411 A can be presented. First file mentions water spraying into the surface of the condenser by means of the nozzles making atomiser spraying. In file numbered CN101650135 A, mention is made of locating condensers created in V form in inverted V form, of the spray nozzles located in spacing remaining between the inverted V and the ground and of wetting inner surface of the condenser by means of them. The last file of Japan origin on the other hand denotes also wetting of outer surfaces of inverted V condenser. Yet, in said systems, failures occur since water is directly sprayed onto surface of the condenser due to corrosive effect of water. And this increases maintenance and repair costs and causes the system stopping, in a relatively frequently.

Due to all these shortcomings, the need has arisen for an efficient and low cost, in addition to being efficient, cooling system and method for air cooled systems.

BRIEF SUMMARY OF THE INVENTION

The invention aims to eliminate the above cited shortcomings, formed on inspirations based on the existing situations.

Priority purpose of the invention is to provide support to the mechanical cooling system by acting as a second unit cooler in air cooled systems. Thus, provision of energy efficiency rate of the mechanical cooling system to be in the highest rate possible is aimed. Particularly, provision of an improvement at an average rate of about 20% in air cooled unit coolers is aimed.

It is also one of the objectives of the invention to increase humidity rate of air in front of the condenser (by wetting in a manner not wetting the condenser or by wetting in negligible amount) during chilling, decreasing dry bulb temperature and provide evaporative (adiabatic) chilling.

The invention aims to reduced the amount of energy consumed by bringing outer air temperature to the lowest value climatic conditions permitting (without wetting the condenser) and to increase said efficiency.

The invention aims that the system consumes the least amount of water by providing spraying only the required amount of water and evaporation thanks to the stepped water spraying system which operates by being controlled with a micro-processor it has.

It is also one of the objectives of the invention that all the water sprayed is evaporated, nozzles are located at a certain distance with the air cooled chiller and there is a net between the nozzle and the chiller, areas wherein suction will not be carried out are also covered with canvas thanks to which contact of the chiller with water is prevented.

The invention also aims, with the canvas it owns apart from said net, to provide that the air comes in through the area wherein humidification is provided and to prevent uncooled air from reaching the condenser.

A purpose of the invention is to lower the rate of carbon dioxide thanks to the efficiency obtained and to make input into sustainable development.

BRIEF DESCRIPTION OF THE SEVERAL VIEWS OF THE DRAWINGS

Structural and characteristic, properties of the invention and all of its advantages will be understood more clearly from the figures provided below and from the detailed description written by making references to these figures and therefore, the evaluation should also be made by taking these figures and the detailed description into account.

The drawings do not need to be absolutely put to scales and details not essential to understand the present invention may have been omitted. Furthermore, the components that are at least identical, or at least substantially have identical functions are illustrated with the same number.

DESCRIPTION OF COMPONENT REFERENCES

Figure 1:
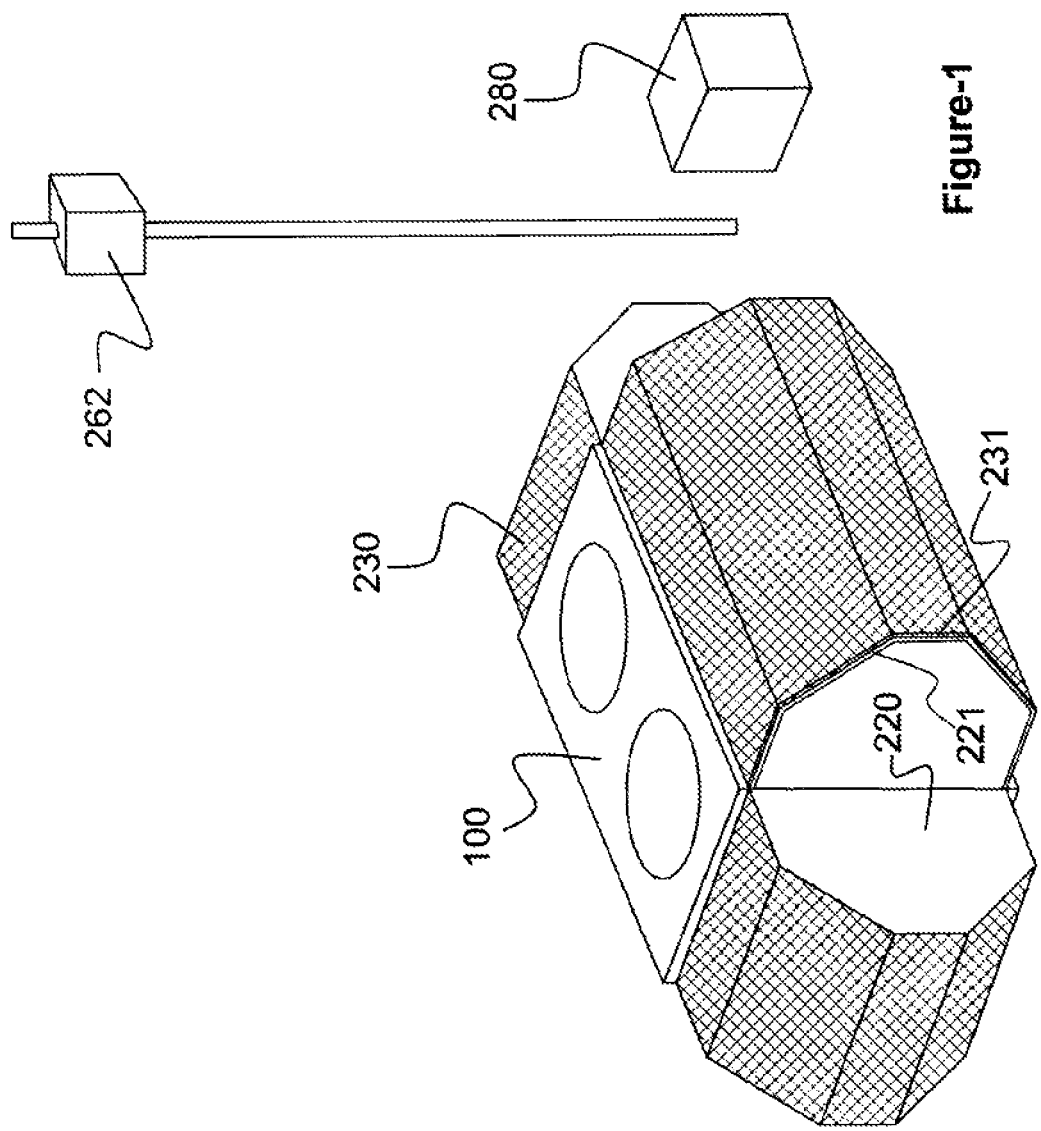
FIG. 1 presents a representative view indicating the cooling system, which is the subject of the invention, and of the related chiller in a ready for operation state.
Figure 2:
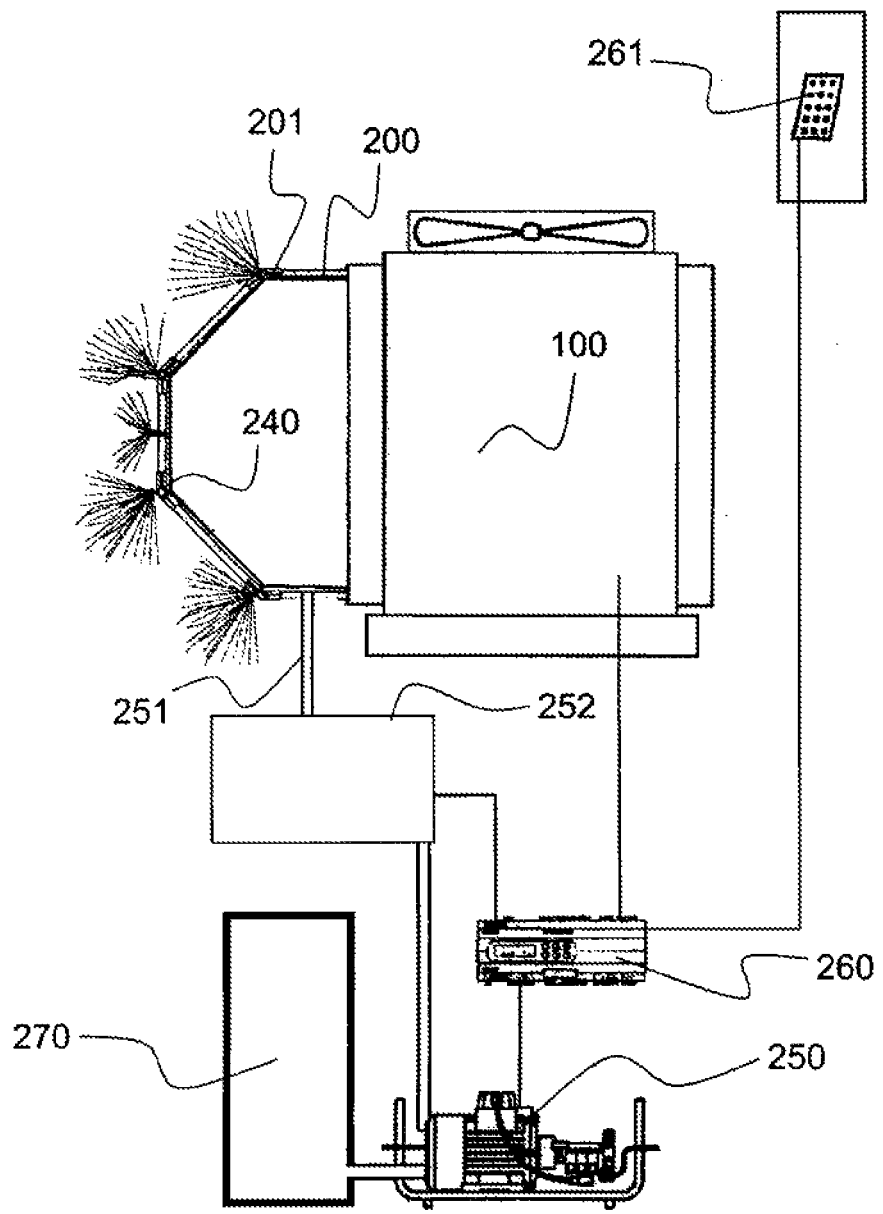
FIG. 2 illustrates a representative scheme of the system.
Figure 3:
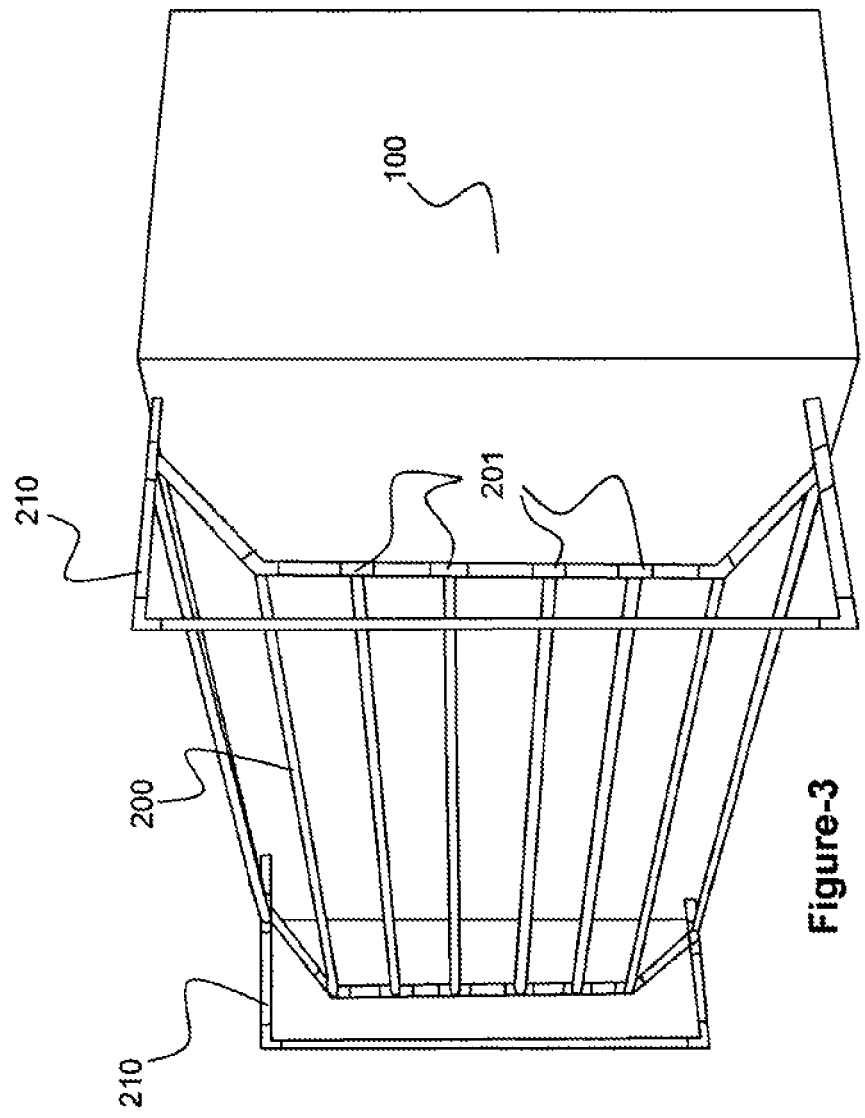
FIG. 3 presents the frame structure of the wind-shielded canvas alternative of the system.

100. Chiller (Existing System)
200. Frame
201. Elastic Corner Fitting
210. Wind shield
220. Closed Surface/Canvas
221. Fastener/Hook-and-loop fastener
230. Net (TOR)
231. Fastener
240. Liquid spraying component/Nozzle
250. Liquid Supply Kit (pump, etc.)
251. Liquid transmission instrument/Pipe
252. Flow Control Kit.
260. Control Unit
261. Sensor
262. Air measurement station
270. Liquid preparation component
280. Cabin

DETAILED DESCRIPTION OF THE INVENTION

In this detailed description, the preferred embodiments and the operations steps of the cooling system and method, which is the subject of the invention, created for air cooled chillers (100) are disclosed only for better understanding of the subject, and in a manner not constituting any restrictive effect.

The invention relates to a cooling system connected to air inlet of an air cooled condenser or of a similar chiller (100), comprising at least one frame (200), at least one liquid spraying component (240) located on said frame (200), at least one net (230) through which the air absorbed by the chiller (100) is passed, at least one liquid supply kit (250) sending liquid to said component (240) and at least one liquid transmission instrument (251) carrying liquid from the liquid supply kit (250) to the spraying component (240).

The basic feature of the invention and method being the subject of the invention is that spraying is performed on the front part of said net's (230) outer surface not facing the chiller (100), contrariwise to the chiller (100) and to the incoming direction of air, and that for this purpose it comprises a liquid, spraying component (240) located in outer surface of the net Thus, temperature of the air which will be absorbed into the chiller (100) is decreased. Also probable water leakage into the chiller (100) is prevented thanks to the net used (TOR) (130). Therefore, said net (130) fixed to said frame (200) that is positioned in a manner remaining at a distance between the chiller (100) and itself. Here the term TOR refers to a net prepared in aperture not reducing the flow rate of the air.

The liquid in the invention is preferably water and said liquid spraying component(s) (240) is/are preferably atomiser nozzle. Thus quick evaporation of the sprayed water is provided.

The frame (200) used in the invention comprises corner fittings (201) in elastic form in order to be possibly created in various shapes and to be in conformity with all kinds of air cooled chillers (100). Thus, depending on the need, frame (200) can be bent or flexed when required. The frame (200) can also comprise at least one wing shield (210) preventing the sprayed liquid from being affected by wind. Thus, desired sides of the nozzles (240) shielded. A closed surface (220) is used to provide entry of the air absorbed into the chiller (100) only through the liquid sprayed net (230) section by closing the sections of the frame (220), wherein no liquid spraying component (240) is found. This surface (220) is also used to obtain said wind shield. To obtain said closed surface (220) preferably canvas and similar textile products known in the art can be used.

Canvas (220) used for the closed surface (220) or for the disclosed alternative has at least one fastener (221) providing its connection with said net (TOR) (230) or with the frame (200). Similarly, said net (230) on the other hand comprises at least one fastener (231). In the preferred embodiment, as fastener (221, 231), easily installed and removable components termed as hook-and-loop fasteners in the textile are used.

In the invention, there exists at least one flow control kit (252) controlling the liquid coming from said liquid supply kit (250) to spraying components (240) by means of liquid transmission instruments (251) wherein preferably the proper pipes known in the art are used. With this flow control arrangement, dissolving of water into air in minimum or maximum amount is provided.

In case the number of flow control kit (252) is for example 3 pieces, one of the kits (252) controls at least one spraying component (240), the second control kit (252) controls spraying component (240) two times more of the number of the first and the third control kit (252) on the other hand controls spraying component (240) two times more of the number of the second. Thus, seven different steps wherein 1, 2, 3, . . . 6 and 7 times more of the nozzles than the number of nozzle the first kit (252) controls can be obtained.

The invention has at least one control unit (260) that controls all of said liquid spraying component (240), the flow control kit (252) and the liquid supply kit (250) under all conditions. Depending on the size of the system, numbers of this control unit (260) and of the flow control kit (252) become increased. In the preferred embodiment on the other hand, the flow control kit (252) is controlled. The control unit (260) comprises at least one sensor (261) providing one of the most significant features of the invention. This control unit (260) keeps the system under control by means of the sensors (261) of various types and features found in the system. The amounts of these sensors (261) increase depending on the size of the system. This sensor (261) is located at least one air measurement station (262) located at a distance wherein it will not be affected by the spraying components (240). Thus, climatic data parameters of the outer environment, wherein the air absorbed into the chiller (100) is procured, are measured and the flow control kit (252) providing flow to the nozzles (240) can be opened and closed in steps according to the need. The amount of the need is determined by making computations by said control unit, thanks to data in the psychometric diagram known in the art. In case the system exceeds a certain size, more than one control unit (260) and flow control it (252) are used in the system. In case these are used, an additional coordinating unit in addition to the control unit (260) is added.

In addition to all these, the invention has at least one liquid preparation component (270) sending liquid to said liquid supply kit (250) (in cases, wherein at the point of application, the water having adverse effects on the system or on the unit cooler is in question) wherein preferably a pump is employed. This component (270) is preferably a filtration component.

The liquid supply kit (250), flow control kit (252), control unit (260) are located at least inside of one cabin (280) and preferably at a point around the chiller (100). The liquid preparation component (270) is located in vicinity of the cabin in cases where need arises. The sensors (261) can be located at a proper location on the cabin (280), the unit cooler (100) and the air measurement station (262). The outer air measurement station (262) can be located nearby the system, in a manner not affected from the system.

The invention claimed is:

1. A cooling system comprising:
    a chiller having an air inlet;
    a frame that is positioned in spaced relation to said chiller;
    a plurality of spraying components positioned on said frame;
    at least one net affixed to said frame, said net adapted to allow air to pass therethrough and into said air chiller, said net not reducing a flow rate of the air;
    at least one liquid supply kit connected to said plurality of spraying components so as to deliver liquid into the spray component;
    at least one liquid transmission instrument connected to the plurality of spraying components and to the liquid supply kit so as to carry liquid from the liquid supply kit to the plurality of spraying components, the plurality of spraying components adapted to spray the liquid onto a front part of an outer surface of the net, said front part of said outer surface of the not facing said chiller and contrary to an incoming direction of the air;
    at least one flow control kit cooperative with the liquid supply kit so as to control the liquid flowing from the liquid supply kit to the spraying component;
    a plurality of sensors adapted to measure climatic values of the air, said climatic value of the air being temperature, humidity and pressure; and
    at least one control unit cooperative with said plurality of sensors and adapted to measure an amount of the liquid flowing to the plurality of spraying components sufficient for the air to become saturated by assessing the measured climatic values received from said plurality of sensors in accordance with a psychometric diagram, the control unit cooperative with the liquid supply kit so as to control the liquid supply kit, said frame having a closed surface in which no liquid spraying component is located, said closed surface providing entry of the air absorbed into said chiller only through the sprayed net by directing the air.

2. The cooling system of claim 1, the plurality of sensors comprising at least one air measurement station on which the sensor is positioned.

3. The cooling system of claim 1, further comprising:
    at least one cabin, the liquid supply kit and the flow control kit and the unit being located in the cabin.

4. A method for cooling air, the method comprising:
    fixing at least one net onto an air inlet of a chiller, the net having an aperture so as to not reduce a flow rate of the air;
    positioning at least one liquid spraying component at a front part of an outer surface of the net not facing the chiller;
    measuring climatic values of air from an ambient environment by, said climate value being temperature, humidity and pressure;
    calculating an amount of liquid to be delivered to the spraying component by a control unit so as to cause the air to be saturated by assessing climatic values received from the plurality of sensors in accordance with a psychometric diagram;
    opening at least one flow control kit that controls the liquid passing from a liquid supply kit to the spraying component in order to supply the calculated amount of liquid by the control unit; and
    spraying the calculated amount of the liquid onto the front part of the outer surface of the net contrary to the chiller and to the incoming direction of the air.

5. The method of claim 4, further comprising:
    positioning the liquid supply kit and the flow control kit and the control unit into a cabin.

6. The method of claim 4, further comprising:
    closing a portion of a frame with a closed surface such that the air passes into the chiller only through the net.

7. The method of claim 6, said closed surface being a canvas material.

8. The method of claim 6, said closed surface connected to said net or said frame by at least one fastener.

9. The method of claim 8, said fastener comprising at least one hook-and-loop fastener.

* * * * *